(12) United States Patent
Shim et al.

(10) Patent No.: US 7,871,537 B2
(45) Date of Patent: Jan. 18, 2011

(54) METHOD FOR FABRICATING MAGNESIUM-BASED HYDROGEN STORAGE MATERIAL

(75) Inventors: Jae-Hyeok Shim, Seoul (KR); Seon-Ah Jin, Seoul (KR); Young-Whan Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 455 days.

(21) Appl. No.: 11/939,636

(22) Filed: Nov. 14, 2007

(65) Prior Publication Data

US 2008/0111105 A1 May 15, 2008

(30) Foreign Application Priority Data

Nov. 14, 2006 (KR) .................... 10-2006-0112215

(51) Int. Cl.
*C09K 3/00* (2006.01)
*B23F 9/04* (2006.01)
*C01B 6/04* (2006.01)
*C22C 23/00* (2006.01)

(52) U.S. Cl. .................... 252/182.32; 252/182.33; 252/181.7; 252/188.26; 252/188.25; 148/420; 75/253; 75/354; 75/596; 420/401; 420/900

(58) Field of Classification Search ............ 252/182.22, 252/181.7, 188.26; 420/402, 900; 148/420; 75/253, 354

See application file for complete search history.

(56) References Cited

U.S. PATENT DOCUMENTS

| | | | | |
|---|---|---|---|---|
| 3,485,585 | A | * | 12/1969 | Snyder ................... 423/647 |
| 4,476,288 | A | * | 10/1984 | Bujadoux ............... 526/124.2 |
| 4,957,727 | A | * | 9/1990 | Bogdanovic ............ 423/647 |
| 5,498,402 | A | * | 3/1996 | Bogdanovic et al. .... 423/463 |
| 5,831,103 | A | * | 11/1998 | Knott .................... 549/504 |
| 5,951,739 | A | * | 9/1999 | Klapdor et al. ......... 75/371 |
| 6,752,881 | B2 | * | 6/2004 | Klassen et al. .......... 148/400 |
| 7,201,789 | B1 | | 4/2007 | Schulz et al. |
| 7,537,748 | B2 | * | 5/2009 | Fujii et al. .............. 423/413 |
| 7,541,013 | B2 | * | 6/2009 | Shim et al. .............. 423/297 |
| 2006/0127304 | A1 | * | 6/2006 | Fujii et al. .............. 423/644 |
| 2006/0194695 | A1 | * | 8/2006 | Au ........................ 502/400 |
| 2009/0121184 | A1 | * | 5/2009 | Fujii ...................... 252/188.25 |
| 2009/0257938 | A1 | * | 10/2009 | Mohtadi et al. ......... 423/286 |

FOREIGN PATENT DOCUMENTS

JP 2004-204309 7/2004

OTHER PUBLICATIONS

Bhat et al., "Catalytic Activity of Oxides and Halides on Hydrogen Storage of MgH$_2$," Journal of Power Sources 159, 2006, pp. 107-110.
Deledda et al., "H-sorption in MgH$_2$ Nanocomposites Containing Fe or Ni with Fluorine," Journal of Alloys and Compounds 404-406, 2005, pp. 409-412.

(Continued)

*Primary Examiner*—Joseph D Anthony
(74) *Attorney, Agent, or Firm*—Sughrue Mion, PLLC

(57) ABSTRACT

A method for fabricating a magnesium-based hydrogen storage material according to the present invention comprises a) forming a mixture of a magnesium hydride powder and a transition metal halide powder, b) adding the mixture and balls into a vessel, c) filling the vessel with an inert gas or hydrogen, and d) subjecting the mixture to high energy ball milling.

7 Claims, 4 Drawing Sheets

OTHER PUBLICATIONS

Jin et al., "Dehydrogenation and Hydrogenation Characteristics of $MgH_2$ with Transition Metal Fluorides," Journal of Power Sources 172, 2007, pp. 859-862.

Ivanov et al., "Hydrogen Interaction with Mechanically Alloyed Magnesium-salt Composite Materials," Journal of Alloys and Compounds 359, 2003, pp. 320-325.

* cited by examiner

METHOD FOR FABRICATING MAGNESIUM-BASED HYDROGEN STORAGE MATERIAL

FIELD OF THE INVENTION

The present invention relates to a method for fabricating a magnesium-based hydrogen storage material, more specifically, a method for fabricating a magnesium-based hydrogen storage material by using a high energy ball milling.

BACKGROUND OF THE INVENTION

Hydrogen can be stored in the forms of a solid, liquid or gas, but a solid-phase hydrogen storage technology which stores hydrogen in the form of a solid material is preferable in terms of stability and efficiency.

Magnesium hydride ($MgH_2$) has a theoretically high hydrogen storage capacity of 7.6% by weight and thus, it is an attractive candidate as a solid-phase hydrogen storage material of a high capacity. However, there exists the problem that the rate of $MgH_2$ formation (storage) and decomposition (emission) are extremely low. It has been reported in early 2000 that if a transition metal or an oxide thereof is added as a catalyst into magnesium hydride, the rates for hydrogen storage and emission become rapid (U.S. Pat. Nos. 6,572,881 and 6,752,881), which induces active studies on magnesium hydride as a hydrogen storage material.

The conventional method for adding the catalyst to magnesium hydride is conducted by pretreating a magnesium hydride powder by high energy ball milling for several tens of hours, subsequently mixing a transition metal powder or an oxide thereof with the ball-milled magnesium hydride powder, and then, conducting high energy ball milling of the powder mixture for several tens of hours or more [W. Oelerich et al. "Metal oxides as catalysts for improved hydrogen sorption in nanocrystalline Mg-based materials," *Journal of Alloys and Compounds*, 315, 237-242 (2001)].

However, the above method has problems in that a) it requires two steps of a complicated high energy ball milling process, b) the productivity is low due to the excessively long high energy ball milling process time, and c) the probability of incorporating impurities during high energy ball milling is high.

SUMMARY OF THE INVENTION

Accordingly, it is an object of the present invention to maximize the hydrogen storage capacity of magnesium hydride, and to accelerate the rates for hydrogen storage and emission by solving the above problems.

In order to attain this object, the present invention provides a method for fabricating a magnesium-based hydrogen storage material, comprising: a) forming a mixture of a magnesium hydride powder and a transition metal halide powder, b) adding the mixture and balls into a vessel, c) filling the vessel with an inert gas or hydrogen, and d) subjecting the mixture to high energy ball milling for 5 to 30 minutes, wherein the transition metal halide may comprise at least one selected from the group consisting of fluorides and chlorides of titanium(Ti), vanadium(V), zirconium(Zr), niobium(Nb), nickel (Ni), iron(Fe) and chrome(Cr); the transition metal halide powder may be added in step a) in an amount of 0.1 to 5 mol % on the basis of the mixture; the ball may have a diameter of 5 to 30 mm; the weight ratio of the mixture to the ball may be 1:1 to 1:100; the ball milling may be conducted using a shaker mill, vibratory mill, planetary mill or attritor mill; and the inert gas may be argon or helium.

BRIEF DESCRIPTION OF THE DRAWINGS

The above and other objects and features of the present invention will become apparent from the following description of the invention taken in conjugation with the following accompanying drawings, which respectively show.

DETAILED DESCRIPTION OF THE INVENTION

Figure 1:
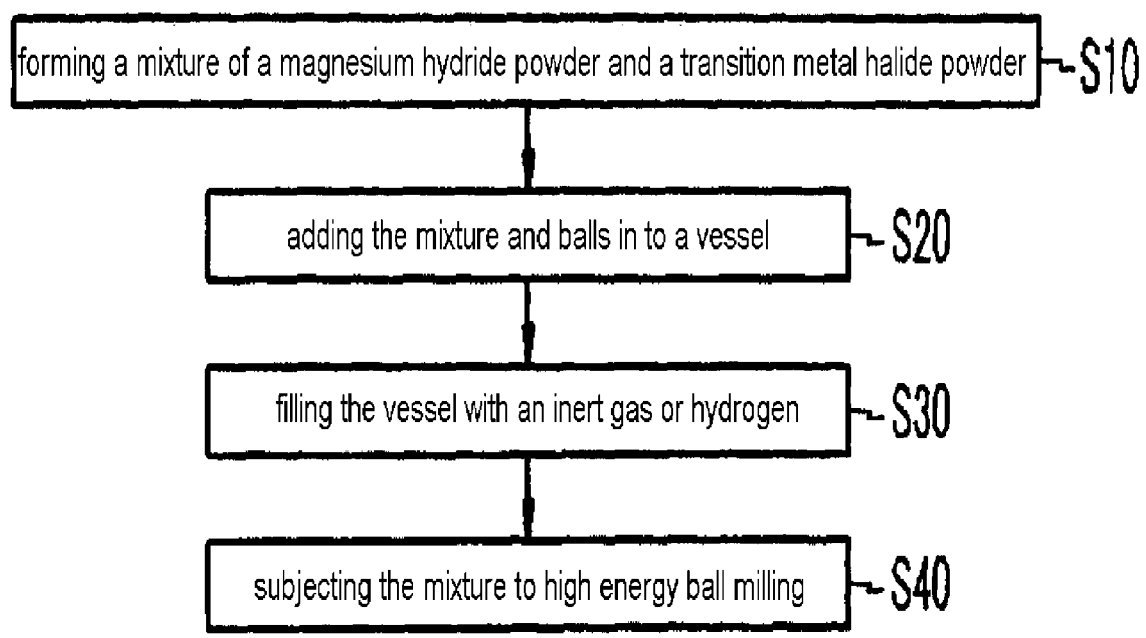
FIG. 1: a flow chart representing the inventive method.

FIG. 1 shows a flow chart representing the inventive method for fabricating a magnesium-based hydrogen storage material.

First of all, a magnesium hydride powder and a transition metal halide powder are mixed each other (S10), wherein the transition metal halide powder may be used in an amount of 0.1 to 5 mol % on the basis of the mixture. When the amount of the transition metal halide powder is less than 0.1 mol %, its catalyst function becomes unsatisfactory. When its amount is more than 5 mol %, the content of magnesium hydride storing hydrogen relatively becomes low resulting in reducing hydrogen storage capacity on the basis of total material.

Subsequently, the mixture of the magnesium hydride powder and the transition metal halide powder is added into a vessel with several balls (S20), wherein it is preferable that the ball has a diameter of 5 to 30 mm. If the diameter of the ball is less than 5 mm, the probability of incorporating the impurities is high, while if the diameter of the ball is more than 30 mm, the openings between the balls are broad, and, therefore, the uniform mixing of the powders can not be achieved. Further, the weight ratio of the mixture to the balls is preferably 1:1 to 1:100 since if the weight ratio is less than 1:1, the chemical reaction of the powder may not occur due to the low strength of milling, while if the weight ratio is more than 1:100, the material (e.g., iron) constituting the balls or the vessel may be incorporated as impurities to the powder mixture due to the high strength of milling.

Next, an inert gas or hydrogen for preventing the explosion resulting from high energy ball milling is filled into the vessel containing the mixture and the balls (S30). The inert gas suitable for use in the present invention may be argon (Ar) or helium (He).

Then, the reaction vessel is hermetically sealed and the mixture is treated by high energy ball milling (S40), and, thus, the transition metal halide catalyst is dispersed in magnesium hydride. The high energy ball milling may be conducted for 5 to 30 minutes by using a shaker mill, vibratory mill, planetary mill or attritor mill. When the milling time is less than 5 minute, the transition metal halide catalyst may not homogeneously be dispersed in magnesium hydride. When the milling time is more than 30 minutes, the probability of incorporating the impurities is high, and segregation and cohesion of the catalyst may occur, to induce reduction of the effect of the catalyst. Those having ordinary skill in the relevant art the present invention pertain to can easily understand high energy ball milling, and, therefore, the concrete explanation thereon is omitted.

The following Examples are given for the purpose of illustration only, and are not intended to limit the scope of the invention.

EXAMPLE

A magnesium hydride powder was mixed with at least one transition metal halide powder selected from the group consisting of niobium fluoride ($NbF_5$), titanium fluoride ($TiF_3$), zirconium fluoride ($ZrF_4$), zirconium chloride ($ZrCl_4$), vanadium fluoride ($VF_4$), vanadium chloride ($VCl_3$), nickel fluoride ($NiF_2$), nickel chloride ($NiCl_2$), chrome fluoride ($CrF_2$), chrome chloride ($CrCl_3$), iron fluoride ($FeF_2$) and iron chloride ($FeCl_3$) in a magnesium hydride powder to transition metal halide powder mole ratio of 99:1.

1 g of the mixture and ten balls made of Cr steel having a diameter of 7.9 mm were introduced into a 70 ml vessel made of tool steel, and subsequently the vessel was filled with argon (Ar), followed by conducting high energy ball milling for 15 minutes using a shaker mill.

Figure 2:
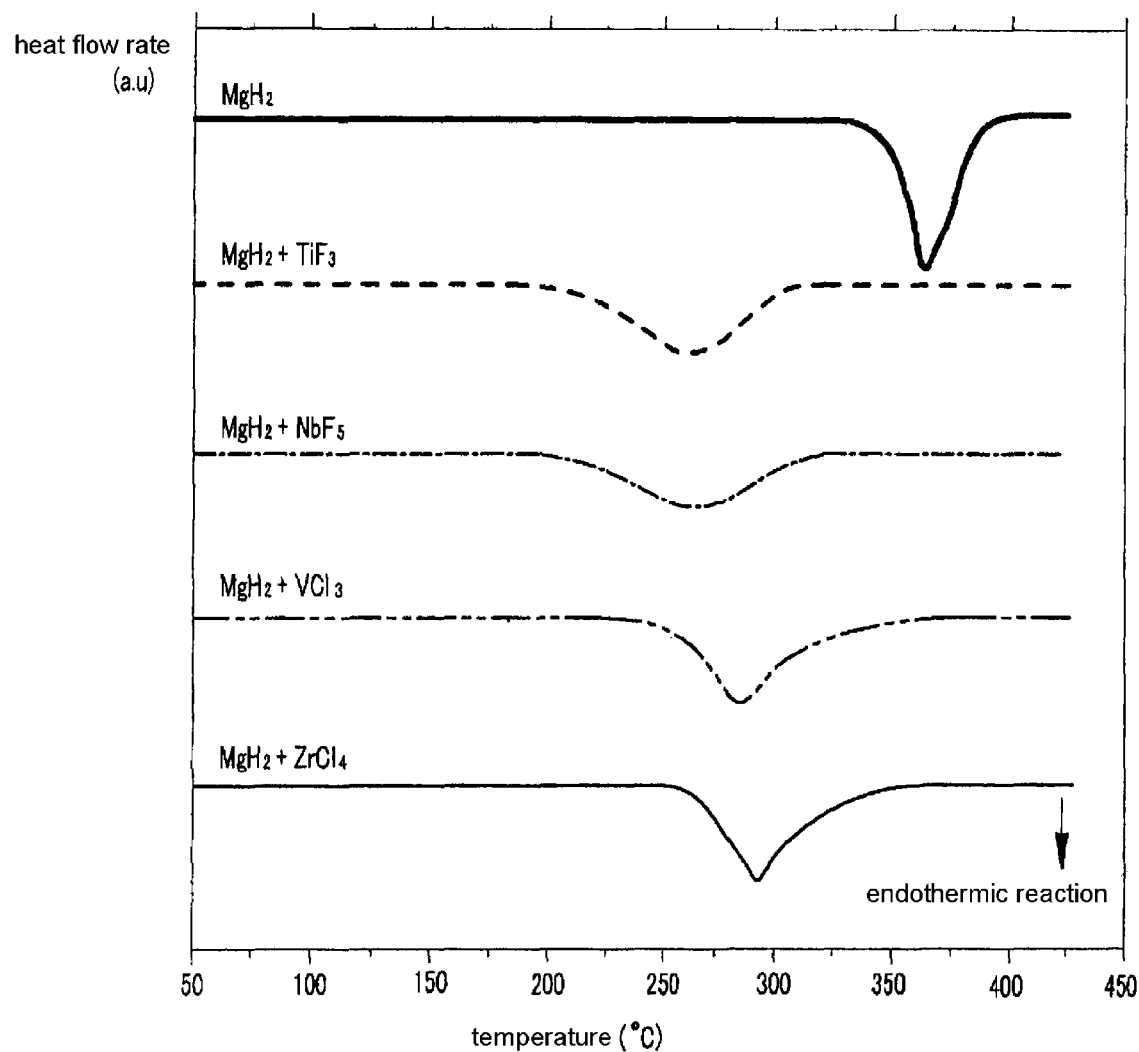
FIG. 2: the results of differential scanning calorimetry measurements conducted to evaluate the change in the hydrogen emission of magnesium hydride when a transition metal halide is dispersed therein by high energy ball milling.

The hydrogen emission properties of the resulting magnesium hydride having a transition metal halide catalyst dispersed therein were analyzed by differential scanning calorimetry, and the results are shown together with the result obtained for magnesium hydride having no catalyst in FIG. 2.

The hydrogen emission reaction of magnesium hydride represented by the formula (I) is an endothermic reaction in view of the peak shown in FIG. 2.

$$MgH_2 \rightarrow Mg+H_2 \quad (I)$$

It was thus found that in case of magnesium hydride having no catalyst, hydrogen emission starts at a temperature in the range of 320 to 400° C., while in case of magnesium hydride having the catalyst dispersed therein, the emission reaction occurs at a temperature of 300° C. or less. Therefore, the transition metal halide is generally effective in lowering the hydrogen emission temperature by about 50 to 100° C. although such effect more or less depends on the type of the transition metal halide.

Figure 3:
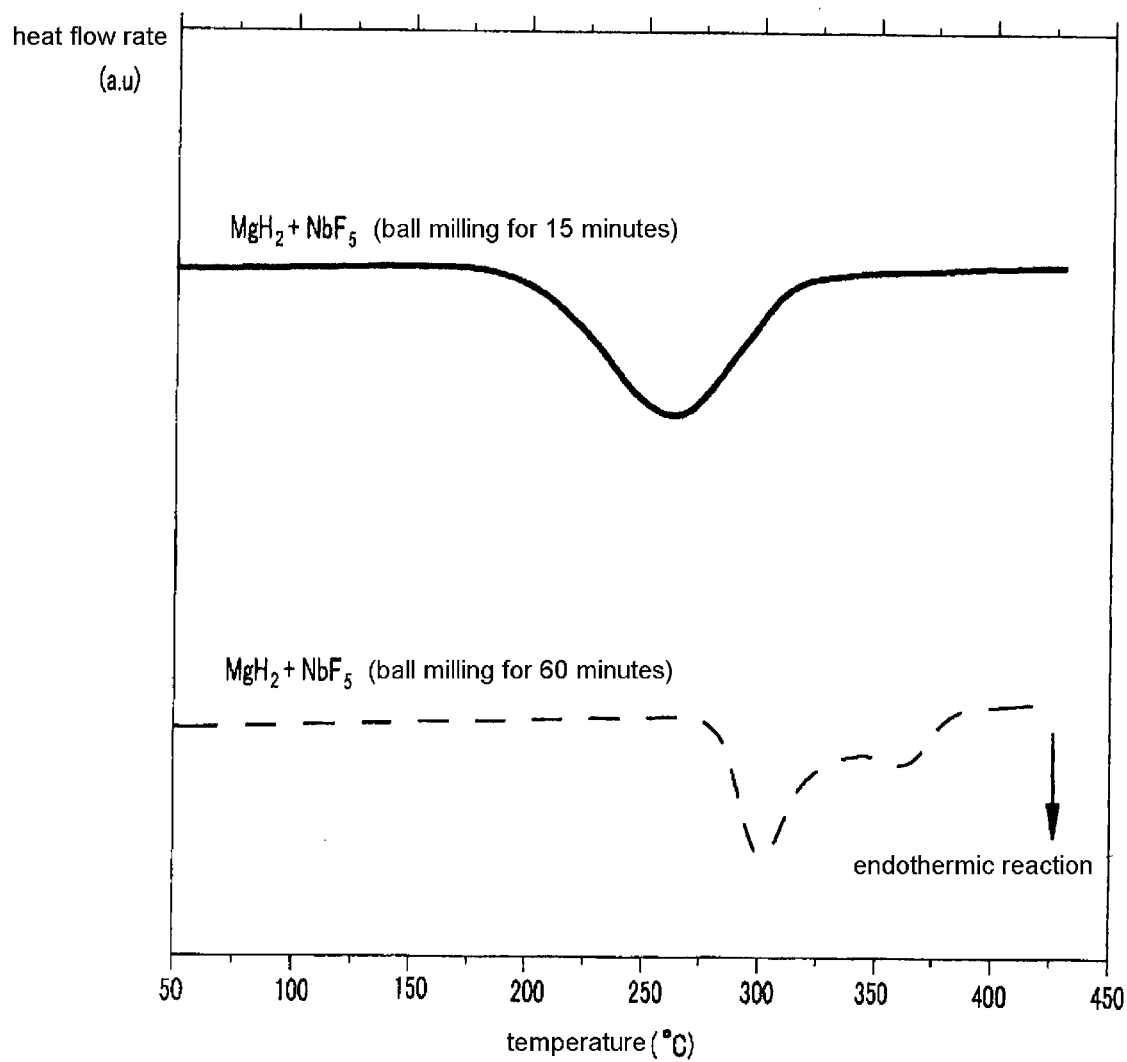
FIG. 3: the results of differential scanning calorimetry measurements conducted to evaluate the change in the hydrogen emission of magnesium hydride after carrying out high energy ball milling of magnesium hydride with which niobium fluoride is mixed.

A magnesium hydride powder having niobium fluoride dispersed therein was prepared by the above procedure except for extending the milling time to 60 minutes. FIG. 3 shows the hydrogen emission characteristics of the two batches of magnesium hydride containing dispersed niobium fluoride prepared by milling for 15 minutes and 60 minutes, respectively. As shown in FIG. 3, as the milling time was extended to 60 minutes, the hydrogen emission temperature markedly increased, and the heat absorption peak split into two and became irregular.

Figure 4:
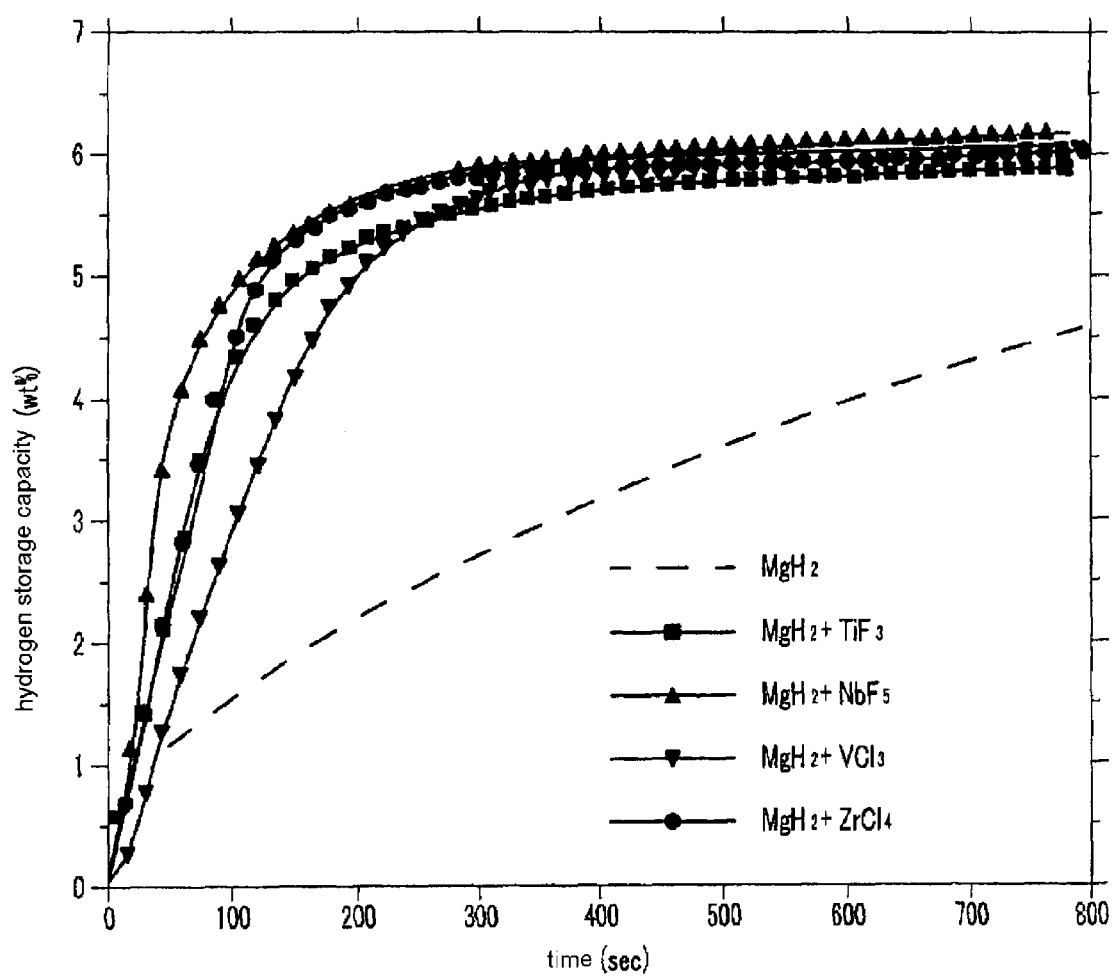
FIG. 4: the results of measurements conducted to evaluate the change in the hydrogen storage amount of magnesium hydride as function of time when a transition metal halide is dispersed therein by high energy ball milling.

The rates of hydrogen uptake (storage) of the samples obtained after the hydrogen emission experiments conducted above were measured under a hydrogen pressure of 10 bar at 300° C. by high pressure differential scanning calorimetry, and the results are shown in FIG. 4. As shown in FIG. 4, in case of magnesium hydride to which no catalyst was added, the hydrogen uptake rate was slow, proceeded to the point of only about 4.5% by weight for 800 seconds, while in case of magnesium hydride having a transition metal halide dispersed therein, the hydrogen uptake rate was fast, proceeded to the point of about 6% by weight which close to the saturation point within 500 seconds.

As described above, the method for fabricating a magnesium-based hydrogen storage material according to the present invention is effective in minimizing the loss of the hydrogen storage capacity and accelerating both the hydrogen storage and emission rates of magnesium hydride.

The invention has been described with respect to the above specific embodiments, but it is not limited to these embodiments and it should be recognized that various modifications and changes may be made to the invention within the scope of the claims, the specification and the appended drawings, which also fall within the scope of the invention.

What is claimed is:

1. A method for fabricating a magnesium-based hydrogen storage material, comprising:
    a) forming a mixture consisting of a magnesium hydride powder and a transition metal halide powder,
    b) adding the mixture and balls into a vessel,
    c) filling the vessel with an inert gas or hydrogen, and
    d) subjecting the mixture to high energy ball milling for 5 to 30 minutes to obtain the magnesium-based hydrogen storage material.

2. The method of claim 1, wherein the transition metal halide powder is added in step a) in an amount of 0.1 to 5 mol % on the basis of the mixture.

3. The method of claim 2, wherein the transition metal halide comprises at least one selected from the group consisting of fluorides and chlorides of titanium(Ti), vanadium(V), zirconium(Zr), niobium(Nb), nickel(Ni), iron(Fe) and chrome(Cr).

4. The method of claim 2, wherein the ball has a diameter of 5 to 30 mm.

5. The method of claim 2, wherein the weight ratio of the mixture to the ball is 1:1 to 1:100.

6. The method of claim 2, wherein the ball milling is conducted using a shaker mill, vibratory mill, planetary mill or attritor mill.

7. The method of claim 2, wherein the inert gas is argon or helium.

* * * * *